Patented Apr. 30, 1940

2,198,970

UNITED STATES PATENT OFFICE 2,198,970

MANUFACTURING ARTIFICIAL MATERIAL FROM POLYVINYL COMPOUNDS

Hans Müller, Berlin-Wilmersdorf, Germany, assignor to Siemens-Schuckertwerke Aktiengesellschaft, Berlin-Siemensstadt, Germany, a corporation of Germany No Drawing. Application May 13, 1937, Serial No. 142,479. In Germany May 18, 1936

9 Claims. (Cl. 260—36)

My invention relates to a method for manufacturing artificial material from polyvinyl chloride, subsequently chlorinated polyvinyl chloride and mixed polymers of polyvinyl chloride.

To attain suitable mechanical properties, softening agents are added to the known artificial materials consisting of such polymerized vinyl compounds. There are, in general, two groups of agents which have a different effect on the properties of the material. Agents of the first group impart to said substances mechanically useful properties within a wide temperature range, but they also have the drawback of unfavorably influencing the electrical properties. Agents of the second group impart good electrical properties to the material, but the mechanical properties are rendered favorable only within a very small temperature range. To the first group belong, for instance, tricresylphosphate, triphenylphosphate, diethylphthalate, dibutylphthalate and polyglycerinacetate and to the second group belong, for instance, liquid mixtures of high-boiling aromatic hydrocarbons or chlorinated aromatic hydrocarbons.

According to the invention, the drawbacks of the known softening agents are avoided by employing as softening agents organic compounds which contain besides one or more aromatic groups one or more aliphatic chains of more than 10 carbon atoms.

As an instance tetradecylbenzoate, or benzylstearate may be mentioned. However, besides these and similar esters, also other derivatives of fatty acids, such as substituted fatty acid amides, for instance, diphenyl or dibenzyl amides of the stearic acid, palmitic acid or oleic acid, may be employed. Particularly advantageous have proved to be mixtures of plasticizers, composed according to the above-mentioned principle, with softening agents of the above-mentioned second group of electrically high-graded aromatic hydrocarbon mixtures of chlorinated hydrocarbons. With such mixtures it is possible to attain the following particularly favorable effect. Certain softening agents composed according to the above principle can no longer be dissolved in appreciable amounts by the polyvinyl chloride or its mixed polymers if the chain of the aliphatic constituents is too long. These agents are, therefore, in themselves useless. If, however, such agents are brought together with aromatic hydrocarbon mixtures, which in themselves are also not unrestrictedly useful on account of the limitation of the elasticity to a very small range of temperature, electrically and elastically excellent mixtures may be obtained. As an instance for said mixtures of softening agents whose individual constituents are useless or inadequate, a mixture of one part of dicetylphthalate and three parts of an aromatic hydrocarbon mixture may be mentioned. This mixture may be produced by causing benzyl chloride to act on naphthalene by means of catalyzers or a mixture of one part of octodecylbenzoate and four parts of chlorinated diphenyl.

I claim as my invention:

1. The method of manufacturing artificial material from substance of the group consisting of polyvinyl chloride, subsequently chlorinated polyvinyl chloride, and polyvinyl chloride mixed polymers, by adding softening means, characterized by employing as softening means organic plasticizers containing at least one aromatic group, and at least one aliphatic group whose carbon chain contains more than 10 carbon atoms.

2. A method for manufacturing artificial material from substance of the group consisting of polyvinyl chloride, subsequently chlorinated polyvinyl chloride, and polyvinyl chloride mixed polymers, by adding softening agents, characterized by employing as softening agents esters of aromatic acids and of highly molecular aliphatic alcohols with more than 10 carbon atoms.

3. A method for manufacturing artificial material from substance of the group consisting of polyvinyl chloride, subsequently chlorinated polyvinyl chloride, and polyvinyl chloride mixed polymers, by adding softening agents, characterized by employing as softening agents esters of aromatic alcohols with highly molecular fatty acids with more than 10 carbon atoms.

4. A method for manufacturing artificial material from substance of the group consisting of polyvinyl chloride, subsequently chlorinated polyvinyl chloride, and polyvinyl chloride mixed polymers, by adding softening agents, characterized by employing as softening agents esters of aromatic alcohols with highly molecular oleic acids with more than 10 carbon atoms.

5. A method for manufacturing artificial material from substance of the group consisting of polyvinyl chloride, subsequently chlorinated polyvinyl chloride, and polyvinyl chloride mixed polymers, by adding softening agents, characterized by employing as softening agents aromatically substituted amides of fatty acids with more than 10 carbon atoms.

6. A method for manufacturing artificial material from substance of the group consisting of polyvinyl chloride, subsequently chlorinated polyvinyl chloride, and polyvinyl chloride mixed polymers, by adding softening agents, characterized by employing as softening agents aromatically substituted amides of oleic acids with more than 10 carbon atoms.

7. The method of manufacturing artificial material from substance of the group consisting of polyvinyl chloride, subsequently chlorinated polyvinyl chloride, and polyvinyl chloride mixed polymers, characterized by adding organic plasticizers containing at least one aromatic group, and at least one aliphatic group whose carbon chain contains more than 10 carbon atoms, in common with highly molecular aromatic hydrocarbons.

8. A method for manufacturing artificial material from substances of the group consisting of polyvinyl chloride, subsequently chlorinated polyvinyl chloride, and polyvinyl chloride mixed polymers, characterized by adding organic plasticizers containing at least one aromatic group, and at least one aliphatic group whose carbon chain contains more than 10 carbon atoms, in common with chlorinated aromatic hydrocarbons.

9. An artificial material comprising substance selected from the group consisting of polyvinyl chloride, subsequently chlorinated polyvinyl chloride, and polyvinyl chloride-mixed polymers, in combination with an organic plasticizer containing at least one aromatic group, and at least one aliphatic group whose carbon chain contains more than 10 carbon atoms.

HANS MÜLLER.